United States Patent
Lee et al.

(10) Patent No.: US 12,511,824 B2
(45) Date of Patent: Dec. 30, 2025

(54) THREE-DIMENSIONAL MODELING METHOD AND APPARATUS USING SAME

(71) Applicant: MEDIT CORP., Seoul (KR)

(72) Inventors: Dong Hoon Lee, Seoul (KR); Won Hoon Choi, Seoul (KR); Beom Sik Suh, Seoul (KR); In Chan Lee, Seoul (KR)

(73) Assignee: MEDIT CORP., Seoul (KR)

(*) Notice: Subject to any disclaimer, the term of this patent is extended or adjusted under 35 U.S.C. 154(b) by 200 days.

(21) Appl. No.: 18/028,415

(22) PCT Filed: Sep. 24, 2021

(86) PCT No.: PCT/KR2021/013042
§ 371 (c)(1),
(2) Date: Mar. 24, 2023

(87) PCT Pub. No.: WO2022/065915
PCT Pub. Date: Mar. 31, 2022

(65) Prior Publication Data
US 2023/0334780 A1 Oct. 19, 2023

(30) Foreign Application Priority Data

Sep. 25, 2020 (KR) .......... 10-2020-0125007
Sep. 24, 2021 (KR) .......... 10-2021-0126318

(51) Int. Cl.
*G06T 11/00* (2006.01)
*A61B 1/24* (2006.01)
(Continued)

(52) U.S. Cl.
CPC ............... *G06T 17/00* (2013.01); *G06T 5/40* (2013.01); *G06T 7/50* (2017.01); *G06T 7/90* (2017.01);
(Continued)

(58) Field of Classification Search
CPC ........ G06T 11/001; G06T 11/20; G06T 11/60; G06T 5/40; G06T 7/90; G06T 7/50;
(Continued)

(56) References Cited

U.S. PATENT DOCUMENTS 9,324,184 B2 * 4/2016 Williams .............. G06T 3/4038
10,750,152 B2 * 8/2020 Babayoff .............. G01J 3/0218
(Continued)

FOREIGN PATENT DOCUMENTS

| CN | 1685364 A | 10/2005 |
| CN | 101256597 A | 9/2008 |

(Continued)

OTHER PUBLICATIONS

Extended European Search Report dated Oct. 10, 2024 in application No. 21872943.2.
(Continued)

*Primary Examiner* — Wesner Sajous
(74) *Attorney, Agent, or Firm* — Sughrue Mion, PLLC

(57) ABSTRACT

A three-dimensional modeling method according to the present invention includes: a scan step of scanning a subject to be filtered so as to obtain at least one set of image data; a step of determining a reference color or a reference color range from a color included in the image data obtained in the scan step and filtering the reference color or the reference color range; and a step of generating a three-dimensional surface model of a subject to be modeled by scanning the subject to be modeled, wherein the step of generating the three-dimensional surface model includes excluding the reference color or the reference color range to generate the three-dimensional surface model.

20 Claims, 12 Drawing Sheets

(51) Int. Cl.
  *G06T 5/40* (2006.01)
  *G06T 7/50* (2017.01)
  *G06T 7/90* (2017.01)
  *G06T 17/00* (2006.01)
  *G06T 17/20* (2006.01)
  *G09G 5/02* (2006.01)
  *H04N 1/58* (2006.01)
  *H04N 1/60* (2006.01)
  *H04N 9/64* (2023.01)

(52) U.S. Cl.
  CPC .... *G06T 17/20* (2013.01); *G06T 2207/10024* (2013.01)

(58) Field of Classification Search
  CPC . G06T 2207/10024; G06T 2207/10028; G06T 2207/30036; G06T 2207/20221; G06T 5/77; G06T 7/0012; A61C 9/0053; A61C 9/006; A61B 1/24; A61B 1/044; G06V 20/653; G06V 2201/033; G09G 5/02; G09G 5/06; G09G 5/10; G09G 2320/0666; G09G 2320/0271; G09G 2320/0276; G09G 2320/06; H04N 1/58; H04N 1/6058; H04N 1/6019; H04N 1/6027; H04N 5/455; H04N 5/57–58; H04N 9/64–78
  See application file for complete search history.

(56) References Cited

U.S. PATENT DOCUMENTS

| | | | | |
|---|---|---|---|---|
| 11,122,180 | B2* | 9/2021 | Pfeiffer | .............. H04N 1/00827 |
| 11,744,681 | B2* | 9/2023 | Kopelman | .............. G06N 20/00 |
| | | | | 433/29 |
| 2003/0034971 | A1* | 2/2003 | Fujiwara | ................. G06T 17/30 |
| | | | | 345/420 |
| 2004/0130546 | A1 | 7/2004 | Porikli | |
| 2014/0177931 | A1 | 6/2014 | Kocherscheidt et al. | |
| 2017/0230636 | A1 | 8/2017 | Choi | |
| 2019/0238820 | A1* | 8/2019 | Babayoff | .............. G06T 7/0012 |
| 2020/0107915 | A1 | 4/2020 | Roschin et al. | |
| 2020/0170760 | A1 | 6/2020 | Dawood | |
| 2020/0170766 | A1* | 6/2020 | Kinugasa | ............... G01N 19/00 |
| 2020/0281700 | A1 | 9/2020 | Kopelman et al. | |
| 2023/0181020 | A1* | 6/2023 | Pesach | ................. A61B 5/0088 |
| | | | | 348/46 |
| 2024/0282233 | A1* | 8/2024 | DeFilippis | ........... G09G 3/3413 |

FOREIGN PATENT DOCUMENTS

| | | |
|---|---|---|
| CN | 102945505 A | 2/2013 |
| CN | 102982350 A | 3/2013 |
| KR | 10-2013-0058972 A | 6/2013 |
| KR | 10-2017-0093445 A | 8/2017 |
| KR | 10-2018-0120908 A | 11/2018 |
| WO | 2020168311 A1 | 8/2020 |
| WO | 2020185527 A1 | 9/2020 |

OTHER PUBLICATIONS

International Search Report for PCT/KR2021/013042 dated, Jan. 3, 2022 (PCT/ISA/210).
Korean Office Action dated Jul. 19, 2023 in Korean Application No. 10-2021-0126318.
Korean Office Action dated Mar. 30, 2023 in Korean Application No. 10-2021-0126318.
Communication dated Aug. 21, 2025 in Chinese Application No. 202180065846.1.

* cited by examiner

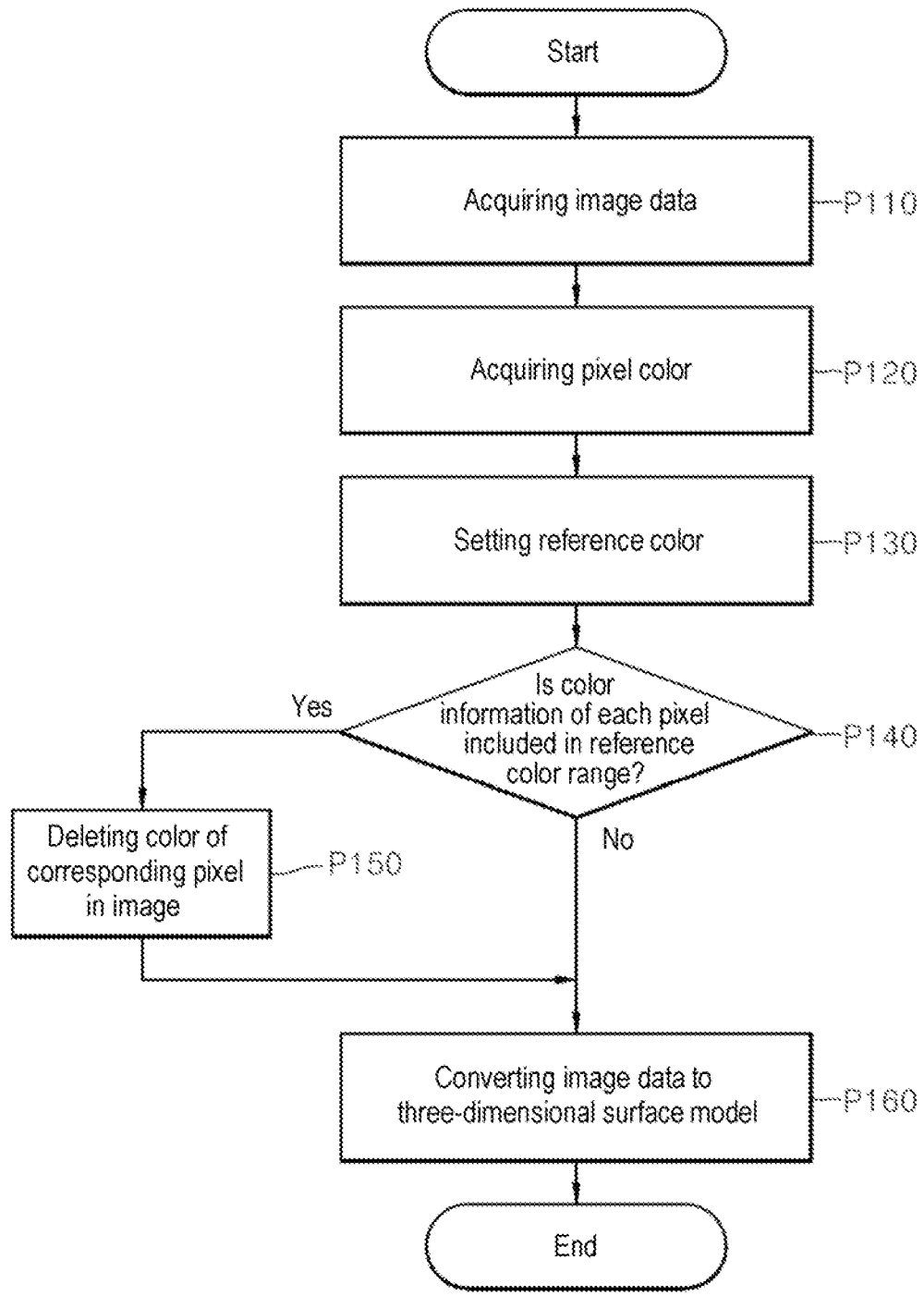

THREE-DIMENSIONAL MODELING METHOD AND APPARATUS USING SAME

CROSS REFERENCE TO RELATED APPLICATIONS

This application is a National Stage of International Application No. PCT/KR2021/013042 filed Sep. 24, 2021, claiming priority based on Korean Patent Application No. 10-2020-0125007 filed Sep. 25, 2020 and Korean Patent Application No. 10-2021-0126318 filed Sep. 24, 2021, the entire disclosures of which are incorporated herein by reference.

TECHNICAL FIELD

The present disclosure relates to a 3-dimensional modeling method and an apparatus using thereof.

BACKGROUND

Three-dimensional scanning technologies have been used in various industrial fields including measurement, inspection, reverse engineering, content generation, CAD/CAM, and medical equipment, and the usefulness thereof has been further expanded by improvement in scanning performance due to development in computing technologies. In addition, there has been active research and development to increase the degree of precision and reliability of final data regarding measurement objects and to improve user convenience, in view of three-dimensional scanning operation environments, for example, the state of the scanner user, scan external environments, and foreign materials attached to the measurement objects.

In particular, during a process of acquiring three-dimensional data (three-dimensional modeling) of a measurement object by using a three-dimensional scanner, objects other than the measurement object are frequently scanned together. For example, during a process of acquiring a three-dimensional model of a patient's oral interior (referring to teeth, gums, and the like) by using a three-dimensional scanner in the dental treatment field, foreign materials existing in a patient's oral interior, hands or sanitary gloves of a user (commonly a dentist or the like) of the three-dimensional scanner, and the like may be scanned and modeled together with the measurement object.

The foreign materials, the user's hands and sanitary gloves, and the like are hindrances to acquisition of the patient's oral model and thus need to be deleted through separate processing during a process of generating a final three-dimensional model, or deleted through post-correction by the user after the final three-dimensional model is generated. The separate processing requires application of an algorithm for removing the non-measurement objects, thereby wasting system resources, and the post-correction operation by the user inevitably depends on manual operations by the user, which require a substantial amount of time.

Moreover, even if the model regarding the non-measurement objects is removed, the accuracy of the three-dimensional model regarding the measurement object is degraded, and this poses a problem in that user convenience is substantially degraded because the measurement object needs to be, for example, re-scanned or the like.

SUMMARY

The present disclosure provides a three-dimensional modeling method and an apparatus using the same, wherein a reference color is determined from image data acquired from a filtering object, or a color within a predetermined range is determined from the reference color as a reference color range that becomes the object of filtering such that, when a modeling object is scanned, a portion corresponding to the reference color or the reference color range is excluded during three-dimensional surface model conversion.

Technical problems to be solved by the present disclosure are not limited to the above-mentioned technical problems, and other technical problems not mentioned herein will be clearly understood from the following description by those skilled in the art.

A three-dimensional modeling method according to the present disclosure may include a scan step of scanning a filtering object so as to acquire at least one set of image data, a filtering step of determining a reference color or a reference color range from a color included in the image data acquired in the scan step and filtering the reference color or the reference color range, and a step of generating a three-dimensional surface model of a modeling object by scanning the modeling object, wherein, in the step of generating a three-dimensional surface model, the three-dimensional surface model is generated by excluding the reference color or the reference color range.

In addition, the filtering step may include a step of generating a color histogram by using a color element value of a color included in each pixel included in the image data, and a pixel number obtained by counting pixels including a color having an identical color element value, and a step of determining the reference color or the reference color range from the color histogram.

In addition, the step of generating a color histogram may further include a histogram correcting step of correcting the color histogram through moving average calibration, and in the step of determining the reference color or the reference color range, the reference color or the reference color range may be determined through a color histogram corrected after the histogram correcting step.

In addition, the color included in the image data may be acquired by using a color model having at least two color elements, and in the filtering step, a color histogram may be generated with a color model different from a color model used to acquire the color of the image data in the scan step.

In addition, in the step of determining the reference color among the step of determining the reference color or the reference color range, the reference color may be determined from a color element value having the largest number of counted pixels in the color histogram.

In addition, in the step of determining the reference color range, the reference color range may be determined by setting a predetermined range of threshold color element value on both sides of a color element value having the largest number of counted pixels.

In addition, in the step of determining the reference color range, the reference color range may be determined by setting a color element value corresponding to a predetermined ratio of a pixel number of a color element value having the largest number of counted pixels, as a threshold color element value.

In addition, the predetermined ratio may differ for each color element.

In addition, the filtering step may further include a reference color range adjusting step in which, when the threshold color element value has a range less than a setup range, the threshold color element value is adjusted to satisfy the setup range.

In addition, the image data of the filtering object acquired in the scan step may include at least one set of first type image data for acquiring color of the filtering object and at least one set of second type image data for acquiring depth information the filtering object, and in the filtering step, the reference color or the reference color range may be filtered by using the first type image data.

In addition, in the scan step, at least one set of two-dimensional image data for acquiring the color of the filtering object may be acquired, and in the filtering step, the reference color or the reference color range may be filtered by using the at least one set of two-dimensional image data.

In addition, in the step of generating a three-dimensional surface model, the three-dimensional surface model may be generated on the basis of multiple pieces of two-dimensional image data of the modeling object acquired by scanning the modeling object, the multiple pieces of two-dimensional image data of the modeling object may include first type image data for acquiring color of the modeling object and second type image data for acquiring depth information the modeling object, and a pixel of the second type image data corresponding to a pixel corresponding to the reference color or the reference color range among the first type image data of the modeling object may be excluded when the three-dimensional surface model is generated.

Meanwhile, a three-dimensional modeling device according to the present disclosure may include a scan unit configured to scan a filtering object so as to acquire image data, and a control unit configured to determine and filter a reference color or a reference color range which is an object of filtering from the image data.

In addition, the control unit may include a color histogram generating unit configured to generate a color histogram by using a color element value of a color included in each pixel included in the image data, and a pixel number obtained by counting pixels including a color having an identical color element value, a histogram correcting unit configured to perform moving average calibration based on the color histogram, and a reference determining unit including at least one of a reference color determining unit configured to determine a reference color from the color histogram or a reference color range determining unit configured to determine a reference color range from the color histogram, the color histogram generating unit may generate the color histogram with a color model different from a color model used by the scan unit to acquire the image data, and the reference determining unit may determine the reference color of the reference color range through a color histogram corrected after the moving average calibration by the histogram correcting unit.

In addition, the reference color determining unit may determine the reference color from a color element value having the largest number of counted pixels in the color histogram, and the reference color range determining unit may determine the reference color range by setting a predetermined range of threshold color element value on both sides of a color element value having the largest number of counted pixels, or determine the reference color range by setting a color element value corresponding to a predetermined ratio of a pixel number of a color element value having the largest number of counted pixels, as a threshold color element value.

In addition, the predetermined ratio may differ for each color element.

In addition, the control unit may further include a reference color range adjusting unit configured such that, when the threshold color element value set by the reference color range determining unit has a range less than a setup range, the threshold color element value is adjusted to satisfy the setup range.

In addition, the image data of the filtering object acquired by the scan unit may include at least one set of first type image data for acquiring color of the filtering object or at least one set of second type image data for acquiring depth information the filtering object, and the control unit may filter the reference color or the reference color range by using the first type image data.

In addition, the scan unit may acquire pieces of two-dimensional image data for acquiring the color of the filtering object, and the control unit may filter the reference color or the reference color range by using the pieces of two-dimensional image data.

In addition, the control unit may generate the three-dimensional surface model on the basis of multiple pieces of two-dimensional image data of the modeling object acquired by scanning the modeling object with the scan unit, the multiple pieces of two-dimensional image data of the modeling object may include first type image data for acquiring color of the modeling object and second type image data for acquiring depth information the modeling object, and a pixel of the second type image data corresponding to a pixel corresponding to the reference color or the reference color range among the first type image data of the modeling object may be excluded when the three-dimensional surface model is generated.

The present disclosure is advantageous in that, in a pre-step of generating a three-dimensional surface model of a modeling object, a reference color or a color in a reference color range, which a filtering object has, is excluded in advance such that three-dimensional modeling is possible based on only the part actually necessary to generate a three-dimensional surface model. As a result, there is an advantage in that a more precise three-dimensional surface model can be acquired, and the reliability of the three-dimensional surface model is improved.

In addition, there is an advantage in that, in a process of generating a three-dimensional surface model of a modeling object, a color in a reference color range corresponding to a filtering object is excluded in advance such that an algorithm for removing the filtering object, which is not to be measured, is unnecessary, thereby reducing waste of system resources.

In addition, there is an advantage in that a post-correction operation by a user is omitted, thereby shortening the time necessary to acquire the final three-dimensional surface model.

In addition, there is an advantage in that two-dimensional image data of a filtering object prior to three-dimensional modeling is used to determine a reference color which is a filtering color, or a reference color range which is a filtering range, thereby reducing system computational load and enabling speedy filtering.

BRIEF DESCRIPTION OF DRAWINGS

FIG. 3 is a flowchart illustrating a process of deleting a reference color range which is a filtering range from image data according to a comparative example of the present disclosure.

BRIEF DESCRIPTION OF REFERENCE NUMERALS

Figure 1:
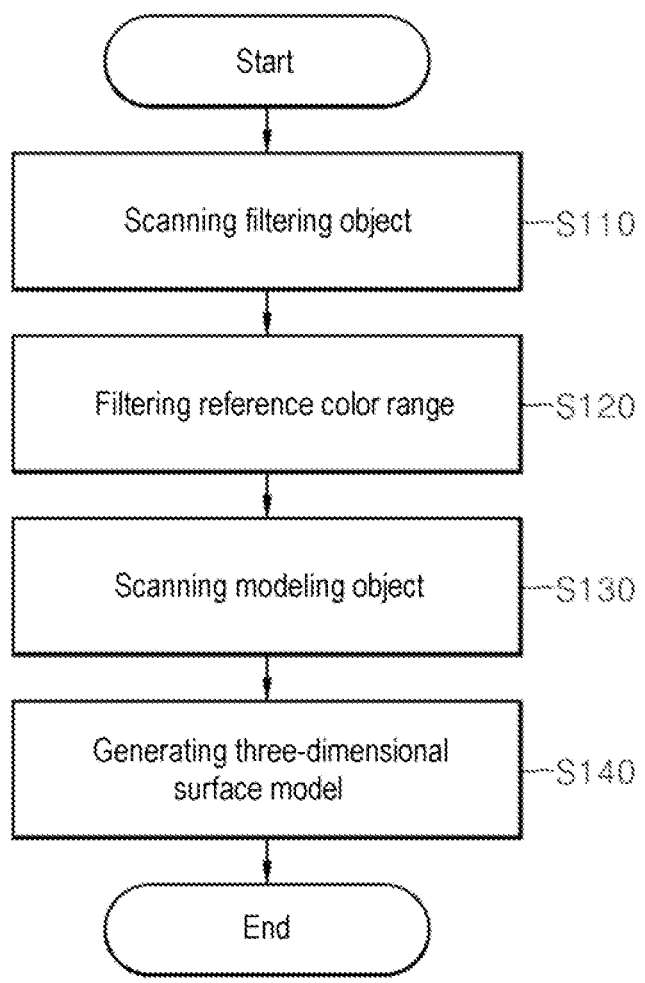
FIG. 1 is a flowchart of a three-dimensional modeling method according to the present disclosure.

S110: filtering object scanning step S120: filtering step
S121: color histogram generating step S122: reference color determining step
S123: reference color range determining step S124: reference color range adjusting step
S1241: setup range assessing step S1242: threshold color element value adjusting step
S130: modeling object scanning step S140: three-dimensional surface model generating step
P110: image data acquiring step P120: pixel color acquiring step
P130: reference color determining step P140: reference color range assessing step
P150: color deleting step P160: three-dimensional surface model converting step
10: three-dimensional modeling device 100: scan unit
110: light-emitting unit 120: light-receiving unit
200: control unit 210: histogram generating unit
220: reference color determining unit 230: reference color range determining unit
240: histogram correcting unit 250: reference color range adjusting unit
300: display unit 20: three-dimensional modeling device
D: filtering object Hs: reference color element value H1: first threshold color element value H2: second threshold color element value
H1': corrected first threshold color element value H2': corrected second threshold color element value
d1: first distance d2: second distance
d1': adjusted first distance d2': adjusted second distance
RT: setup range

DETAILED DESCRIPTION

Hereinafter, embodiments of the present disclosure will be described in detail with reference to the accompanying drawings. It is to be noted that, in connection with assigning reference numerals to components in respective drawings, identical components are given identical reference numerals, although displayed in different drawings, if possible. In addition, in the following description of embodiments of the present disclosure, detailed descriptions of related known configurations or functions will be omitted if deemed to impede understanding of embodiments of the present disclosure.

In connection with describing components of the embodiments of the present disclosure, terms such as first, second, A, B, (a), and (b) may be used. Such terms are only intended to differentiate a component from another component, and do not limit the nature, sequence, order, or the like of the components. In addition, all terms used herein, including technical or scientific terms, have the same meanings as generally understood by those skilled in the art to which the present disclosure pertains, unless otherwise defined. Terms defined in generally used dictionaries are to be interpreted as having meanings in the context of relevant technologies, and are not interpreted in ideal or excessive formal senses unless otherwise defined explicitly herein.

Hereinafter, a three-dimensional modeling method according to the present disclosure will be described in detail.

Figure 2:
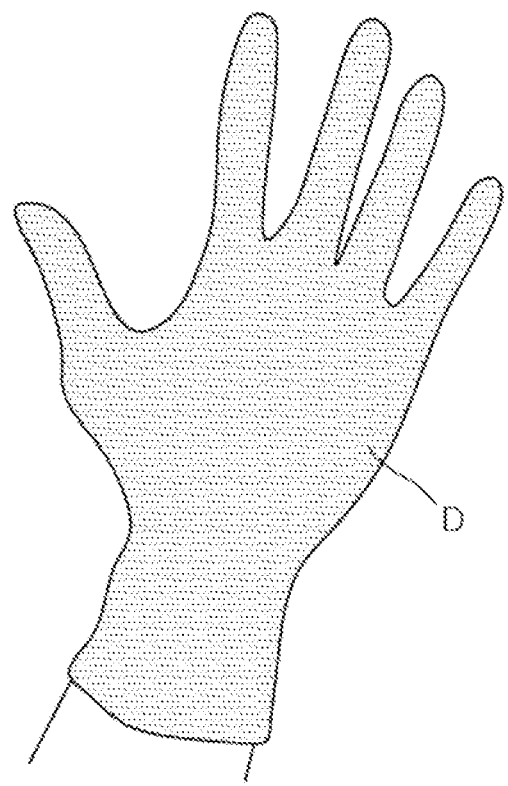
FIG. 2 illustrates a filtering object disclosed in FIG. 1.

FIG. 1 is a flowchart of a three-dimensional modeling method according to the present disclosure. FIG. 2 illustrates a filtering object disclosed in FIG. 1.

Referring to FIG. 1, the three-dimensional modeling method according to the present disclosure includes a scan step (S110) of scanning a filtering object so as to acquire at least one set of image data, and a step (S120) of determining a reference color or a reference color range from a color included in the image data acquired in the scan step (S110), and filtering the reference color or the reference color range. In addition, the method includes a step (S130) of scanning a modeling object, thereby generating (S140) a three-dimensional surface model of the modeling object. In the step (S140) of generating a three-dimensional surface model, the three-dimensional surface model may be generated by excluding the reference color or the reference color range.

In the present disclosure, an object, for which a final three-dimensional surface model is to be acquired, will be referred to as a "modeling object," and an object that requires filtering so as not to be scanned together in a process of scanning the modeling object will be referred to as a "filtering object."

The technical concept of the three-dimensional modeling method according to the present disclosure is that, in a process of generating a three-dimensional surface model regarding a modeling object, a reference color or a color in a reference color range, which corresponds to a filtering object, is excluded in advance. Hereinafter, a process of acquiring a three-dimensional model of a patient's oral interior (referring to teeth, gums, and the like) by using a three-dimensional scanner will be described as an example of the three-dimensional modeling method according to the present disclosure, for convenience of description.

In the process of using a three-dimensional scanner to generate a three-dimensional surface model of teeth in the oral interior of the patient, the hands or sanitary gloves of the scanner user, saliva from the patient's oral cavity, surgical tools, and foreign materials in the oral cavity may be scanned together with teeth and input as image data. In such a case, the teeth in the patient's oral cavity may be the model object, and the hands or sanitary gloves of the user, saliva from the patient's oral cavity, and foreign materials in the oral cavity may be filtering objects.

FIG. 2 illustrates a scanner user's sanitary glove as an example of a filtering object D. The sanitary glove may have a single color, but commonly has a group of various colors.

As such, a filtering object scanned together in a process of scanning the modeling object impedes acquisition of a three-dimensional surface model of the modeling object of a high degree of reliability, and thus needs to be excluded from the three-dimensional surface model generating object before the three-dimensional surface model of the modeling object is generated.

According to an embodiment of the three-dimensional modeling method according to the present disclosure, prior to scanning a modeling object, a filtering object is scanned first (S110). By scanning the filtering object, image data including the filtering object may be acquired, and the image data may refer to a shot of a two-dimensional or three-dimensional image.

In general, the filtering object has a different color from the modeling object, and by pre-scanning the filtering object so as to acquire the color (or color group) that the filtering object has, the same may be excluded in a later process of scanning the modeling object.

In order to acquire the color of the filtering object, two-dimensional image data or three-dimensional image data of the filtering object may be utilized.

At least one set of image data may be acquired, but multiple pieces thereof may be acquired as along as the system memory and the time taken for scanning are not wasted inefficiently, thereby improving the precision.

Specifically, to describe a process of acquiring the color of the filtering object by utilizing two-dimensional image data of the filtering object, a snapshot or a photograph of the object may be taken in the scan step (S110), thereby acquiring two-dimensional image data. The two-dimensional image data may be acquired by consecutively capturing multiple (for example, about fifty) shots of image data.

The filtering object is an object for which it is unnecessary to acquire a three-dimensional surface model and furthermore, has an advantage in that it is easier and faster to acquire a color from a two-dimensional image than acquiring a color from a three-dimensional surface model (three-dimensional image). Therefore, by acquiring the color of the filtering object from two-dimensional image data, unnecessary processing may be reduced, thereby preventing waste of resources and shortening the time. Image data acquired by scanning may be a result of operation of a light-receiving unit 120 of a three-dimensional device 10 (described later).

The scan step (S110) will be described in more detail with reference to an example. In the scan step (S110), a filtering object may be scanned so as to acquire at least one set of first type image data and at least one set of second type image data. The first type image data is for acquiring color information of the filtering object. The first type image data may be acquired by a scanner for scanning the filtering object, and an optical projector embedded in the scanner or provided separately from the scanner may be used. As an example, the optical projector may emit white light to the filtering object under predetermined control, and the scanner may scan the filtering object to which the light emitted from the optical projector is applied. A camera embedded in the scanner may be a color camera, and the scanner may acquire at least one set of first type image data representing the filtering object to which white light has been applied, in the scan step (S110). By means of the acquired first type image data, color information of the filtering object may be acquired.

As another example, the optical projector may emit each of red light, green light, and blue light to the filtering object under predetermined control, and the scanner may scan the filtering object to which the light emitted from the optical projector is applied. The camera embedded in the scanner may be a mono camera, and the scanner may acquire at least three pieces of first type image data representing the filtering object to which each light has been applied, in the scan step (S110). For example, in the scan step (S110), the scanner may acquire at least one set of first type image data representing the filtering object to which red light has been applied, at least one set of first type image data representing the filtering object to which green light has been applied, and at least one set of first type image data representing the filtering object to which blue light has been applied. According to a combination of the acquired pieces of first type image data, color information of the filtering object may be acquired.

Thereafter, the optical projector may emit light of a different type from the light emitted to acquire the first type image data to the filtering object. As an example, the optical projector may emit a stripe shape, which is an example of structured light, having a bright portion and a dark portion alternating with each other, to the filtering object. The stripe shape may be a horizontal stripe shape or a vertical stripe shape. However, the above-mentioned example is not limiting in any manner, and any type of light can be used as along as two-dimensional image data has depth information. A three-dimensional surface model may be generated from the two-dimensional image data having depth information.

Meanwhile, as another embodiment for acquiring the color of the filtering object by utilizing two-dimensional image data, a process of generating a three-dimensional surface model of the filtering object with a scanner may be used.

To describe in detail, there is a known technology by which multiple pieces of two-dimensional image data regarding a measurement object are acquired by using a three-dimensional scanner including a light source and a camera, and a three-dimensional surface model is acquired therefrom.

In an embodiment of present disclosure, when the camera of the three-dimensional scanner acquires multiple pieces of two-dimensional image data from a filtering object in order to generate a three-dimensional surface model of the filtering object, a three-dimensional surface model is acquired from accurately-focused two-dimensional image data among the pieces of image data. Therefore, two-dimensional image data used to generate the three-dimensional surface model inversely may be considered as accurately-focused two-dimensional image data, and a color may be extracted therefrom.

The accurately-focused two-dimensional image data may be used to acquire a three-dimensional surface model of the filtering object, but it is unnecessary to acquire a three-dimensional surface model from two-dimensional image data of the filtering object in an embodiment of the present disclosure. It is actually unnecessary to acquire a three-dimensional surface model of the filtering object, and it is thus enough to extract a color by using image data having an optical focal value.

According to the above embodiment, accurately-focused high-quality image data can be selected compared with two-dimensional image data acquired by capturing a snapshot or a photograph of the filtering object described above, and a color included in a pixel of the image data has an accurate color element value, thereby providing an advantage in that it is easy to calculate a color element value of a color included in each pixel of image data in the filtering step (S120) described later. There is another advantage in that image data can be directly acquired by using a camera provided in the three-dimensional scanner, instead of a separate camera for obtaining image data of the filtering object.

Meanwhile, an RGB light source may be used to acquire an image in the scan step (S110), or at least one of 1D line scan, triangulation based on structured light, confocal, and other schemes may be used. However, the RGB light source is not necessarily used to acquire an image in the scan step (S110), and no separate light source may be used when a color image sensor is used to perform the scan step (S110). In addition, when a reference color or a reference color range (described later) is determined from a two-dimensional image, light for three-dimensional modeling, such as structured light, may not be used.

FIG. 3 is a flowchart illustrating a process of deleting a reference color range which is a filtering range from image data according to a comparative example of the present disclosure.

As in the comparative example of the present disclosure, a method may be considered in which image data of a filtering object and a modeling object is acquired together, and a reference color or a reference color range is determined therefrom.

For convenience of description, a single color to be filtered will hereinafter be referred to as a "reference color," and a color range to be filtered will hereinafter be referred to as a "reference color range."

Referring to FIG. 3, an object to be scanned undergoes a scan process so as to acquire both image data of a filtering object and image data of a modeling object (P110). Image data has multiple pixels so as to correspond to the image quality of a scanner, and each pixel includes color information. Therefore, the color of each pixel may be acquired (P120).

After acquiring the color of each pixel from image data, the color to be filtered may be set as a reference color (P130). For example, in the step (P130) of setting a reference color, a reference color desired by the user may be set on a color palette on a user interface (UI).

After setting the reference color, a group of colors within a predetermined range from the reference color is determined as a reference color range, and it is confirmed whether color information included in each pixel of acquired image data is included in the reference color range (P140). When color information included in each pixel is included in the reference color range, color information included in pixels including the corresponding color information within image data is deleted (P150), thereby excluding the same from three-dimensional surface model conversion. Therefore, it may be considered that no data is input in connection with pixels from which color information is deleted. After processing the pixels including color information corresponding to the reference color range, image data may be converted to a three-dimensional surface model (P160).

According to the above-described comparative example, image data including both the filtering object and the modeling object is acquired, and a reference color or a reference color range is manually set on a color palette from the corresponding image data, thereby posing a concern that the same may lead to inaccurate filtering. In addition, there is a problem in that a three-dimensional surface model with a low degree of reliability may be acquired because the reference color or the reference color range is deleted from image data acquired for both the filtering object and the modeling object. Therefore, accurate and highly-reliable data may be acquired by predetermining a reference color or a reference color range from image data of the filtering object only, and then excluding the reference color or the reference color range when scanning the modeling object, as in an embodiment of the present disclosure.

FIG. 4 is a diagram for describing a color model used for a three-dimensional modeling method according to the present disclosure.

Referring to FIG. 4, colors included in image data of a filtering object acquired through a scan step (S110) may be acquired by using a color model having at least two color elements.

As used herein, the color model refers to any of various models known in the art, such as a gray model, an RGB model, an HSV model, a YCbCr (YUV) model, and a CMYK model. Among these, the gray model does not conform to the category of "color," which is a concept used in a three-dimensional modeling method according to the present disclosure. The gray model expresses image pixel values in terms of 0 (black) to 255 (white), and substantially expresses images in terms of brightness information only. It is very difficult to determine a reference color range with such brightness information alone, and if external light interference occurs, it is practically impossible to acquire an accurate reference color, reference color range, and three-dimensional surface model.

Therefore, in connection with using a three-dimensional modeling method according to the present disclosure, a chromatic-series color model having at least two color elements may be used, and it is typically preferred to use the RGB model or the HSV model.

Figure 4A:
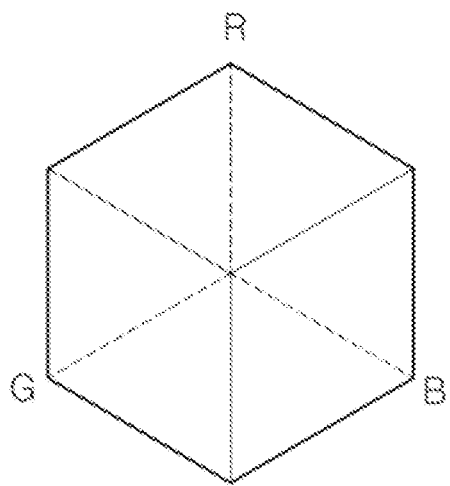
FIG. 4 is a diagram for describing a color model used for a three-dimensional modeling method according to the present disclosure.

As used herein, "color element" refers to a component for expressing a specific color in a color model, and the RGB model has color elements of R (red), G (green), and B (blue) as illustrated in FIG. 4A. Each color element (R, G, B) of the RGB model may have a color element value in the integer range of 0-255, and 256×256×256 colors can thus be expressed in the RGB model.

Figure 4B:
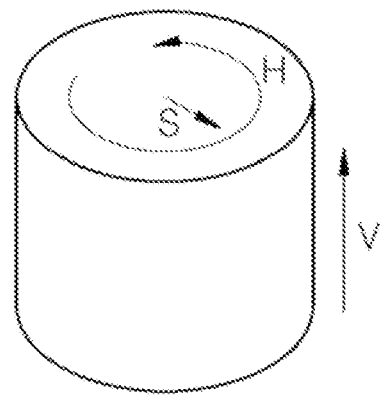

In addition, the HSV model has color elements of H (hue), S (saturation), and V (value) as illustrated in FIG. 4B. Color element H of the HSV model may have a color element value in the range of 0° to 360°, S may have a color element value in the range of 0 to 100%, and V may have a color element value in the range of 0 to 100%. In some cases, color element H of the HSV model may have a color element value in the integer range of 0 to 360, S may have a color element value in the integer range of 0 to 255, and V may have a color element value in the integer range of 0 to 255.

Figure 5:
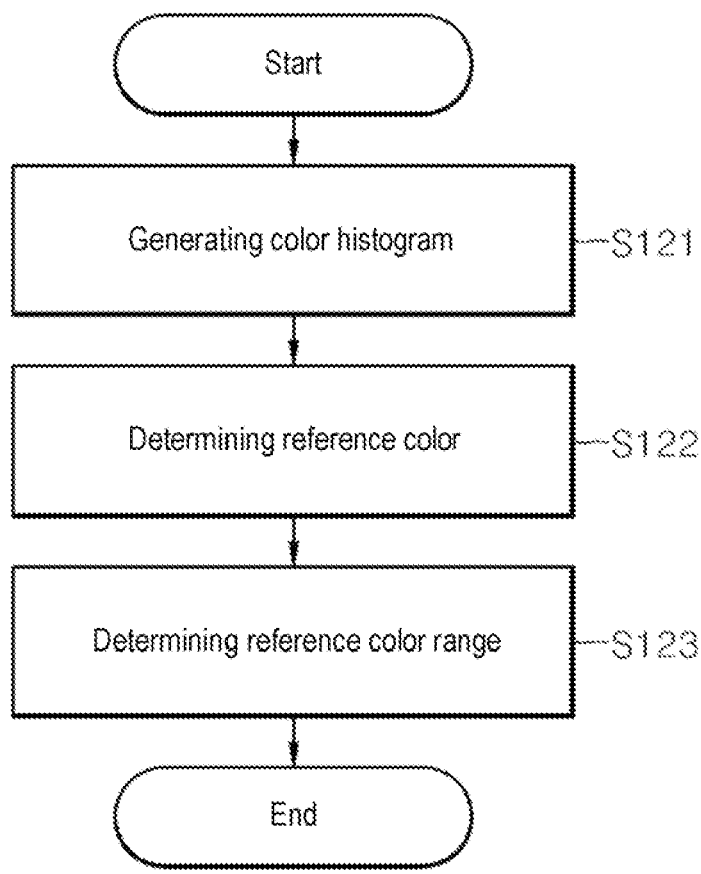
FIG. 5 is a flowchart of a detailed configuration of a filtering step in a three-dimensional modeling method according to the present disclosure.

FIG. 5 is a flowchart of the detailed configuration of a filtering step (S120) in a three-dimensional modeling method according to the present disclosure. FIG. 6 is a color histogram generated for each color element by a specific color model in a three-dimensional modeling method according to the present disclosure.

Referring to FIG. 5, the filtering step (S120) may include a step (S121) of generating a color histogram by using color element values of colors included in respective pixels of image data, and the pixel number obtained by counting pixels including colors having identical color element values, and a step of determining a reference color or a reference color range from the color histogram. Meanwhile, in the step of determining a reference color or a reference color range, a color or a color range, which satisfies a predetermined condition, may be determined as a reference color. The detailed process of determining the reference color or reference color range will be described later.

Meanwhile, the step of determining a reference color or a reference color range may include a step (S122) of determining a reference color from the color histogram, and a step (S123) of determining a reference color range, which is a filtering range, from the reference color determined in the reference color determining step (S122).

First, in the step (S121) of generating a color histogram, colors are acquired from image data acquired from a filtering object. Since each pixel of image data includes color information, all colors that individual pixels of image data have may be acquired therefrom.

Acquired colors of individual pixels have color element values of a specific color model (for example, RGB model or HSV model). For example, colors of individual pixels may have color element values of H (hue), S (saturation), and V (value), which are color elements of the HSV model. For example, the yellow color has a color element value of (52,55,98) on the HSV color code table. Color element values of the colors of all pixels acquired by the above method may be acquired. The color model of use may be the above-mentioned HSV model or RGB model. In addition, without being limited thereto, at least one of chromatic color models may be used, such as a CMYK model or a YCbCr model.

Meanwhile, in the step (S121) of generating a color histogram, the color histogram is generated by counting the number of pixels including colors having identical color element values. The detailed method for generating the color histogram will hereinafter be described in detail.

Referring to FIG. 6, a result of generating a color histogram for each color element may be identified. A "color histogram" refers to a graph obtained by collecting color information included in pixels, which constitute image data of a filtering object, and expressing what color element value each color has on a color model.

Figure 6A:
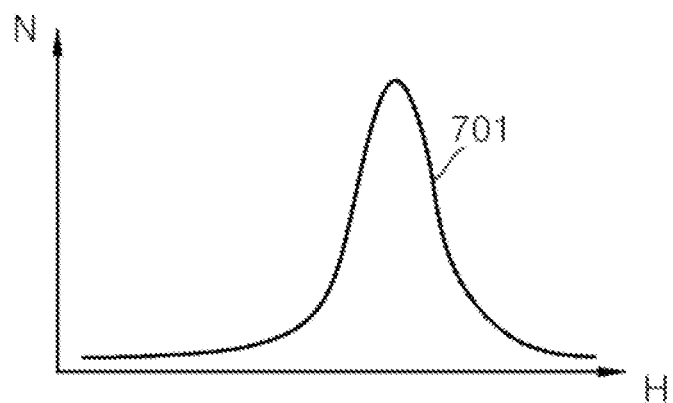
FIG. 6 is a color histogram generated for each color element by a specific color model in a three-dimensional modeling method according to the present disclosure.
Figure 6B:
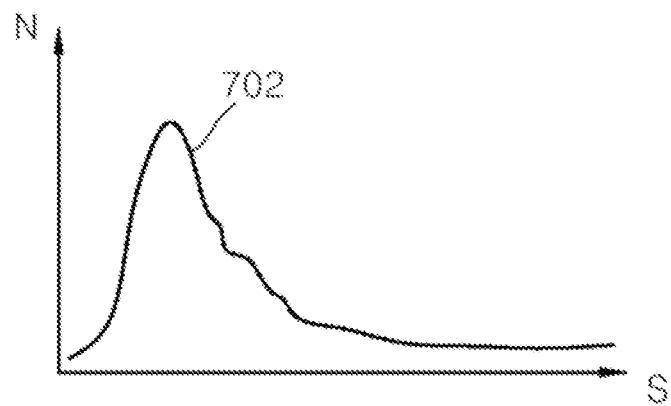
Figure 6C:
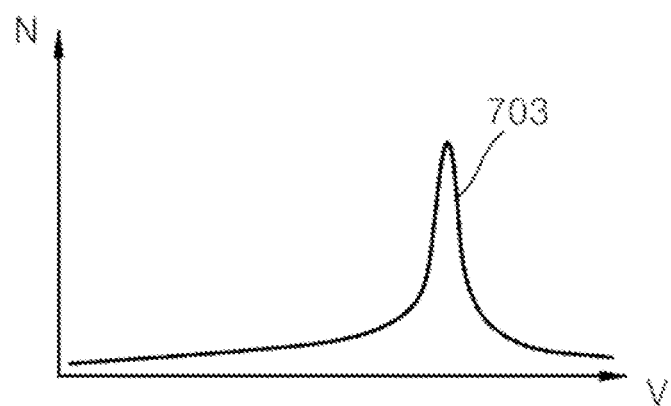

For example, when the color model is the HSV model, FIG. 6A, FIG. 6B, and FIG. 6C correspond to histograms 701, 702, and 703 when the horizontal axis corresponds to color element H (hue), when the horizontal axis corresponds to color element S (saturation), and when the horizontal axis corresponds to color element V (value), respectively. These histograms will be referred to as an H-N histogram 701, an S-N histogram 702, and a V-N histogram 703, respectively.

The horizontal axes of the histograms illustrated in FIG. 6 indicate color element values of respective color element H, S, and V, and the vertical axes indicate pixel numbers N obtained by counting pixels including colors having identical color element values in acquired image data. Depending on the color model, the color element value of H may have an angle value between 0° to 360°, the color element value of S may have a percentage value between 0% to 100%, and the color element value of V may have a percentage value between 0% to 100%.

In the step (S121) of generating a color histogram, a color histogram may be generated for each color element H, S, V by using color element values of colors of all pixels acquired.

Referring to FIG. 6, a generated color histogram makes it possible to identify the most acquired (counted) pixel that includes a color having a specific color element value according to each color element.

As such, the color having the most counted pixel number is a color that is the most included in image data of the filtering object, and may be set as a reference color corresponding to the filtering object. The reference color determining step will be described later.

Meanwhile, in the filtering step (S120), a color histogram may be generated by using a color model different from that used to acquire colors of image data in the scan step (S110). More specifically, in the step (S121) of generating a color histogram among the filtering step (S120), a color histogram may be generated by using a color model different from that used to acquire image data in the scan step (S110). For example, the color model used in the scan step (S110) may be the RGB model, and the color model used in the filtering step (S120) may be the HSV model.

Specifically, when acquiring image data in the scan step (S121), the scan unit may emit light having at least one color. For example, the light may be red light (255, 0, 0), green light (0, 255, 0), and blue light (0, 0, 255) in the RGB model.

In the scan step, image data may be acquired in the RGB model by emitting RGB colors, or image data may be acquired without emitting light with a color image sensor, for example, thereby acquiring colors included in the image data in terms of the RGB model.

In order to detect color information from images generated using the RGB model, all three attributes of R, G, B need to be referred to. However, in the case of an HSV image, H (hue) has pure tone information having a predetermined range, and color classification is easier in the case of HSV images than RGB images. Easy color classification has an advantage in that the reference color and the reference color range (described later) can also be determined easily. Therefore, in the step (S121) of generating a color histogram, colors of image data acquired according to the RGB model may be converted to those according to the HSV model and then used. Converting images generated according to the RGB model to images according to the HSV model can be easily performed by a widely known conversion formula (RGB to HSV conversion formula), detailed description of which will be omitted herein.

Figure 7:
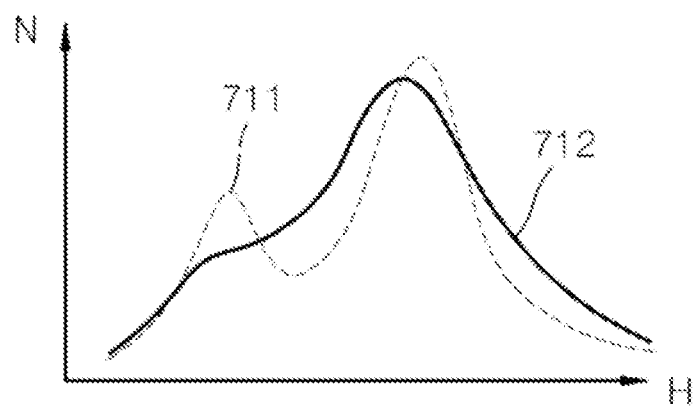
FIG. 7 illustrates a histogram acquired in a step of generating a color histogram, together with a histogram corrected in a histogram correction step.
Figure 8:
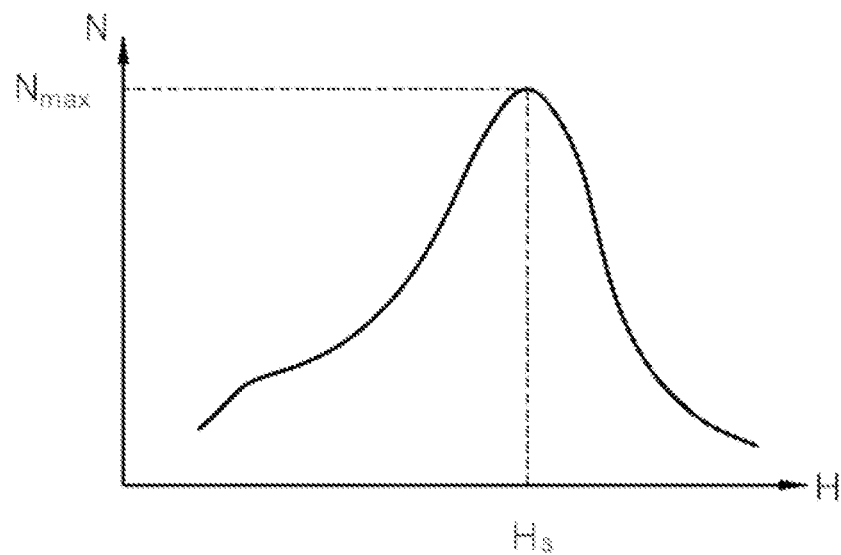
FIG. 8 is a diagram for describing a reference color determining step.
Figure 9:
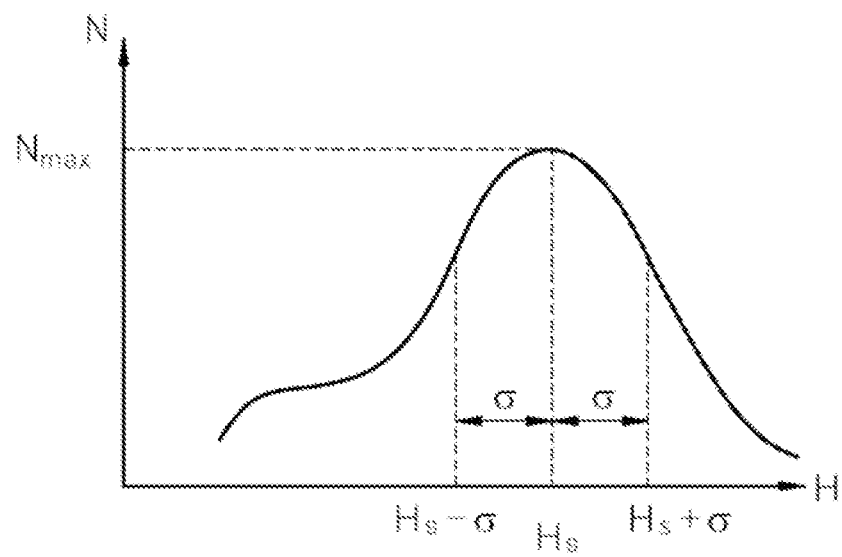
FIG. 9 is a diagram for describing a reference color range determining step according to an embodiment of the present disclosure.
Figure 10:
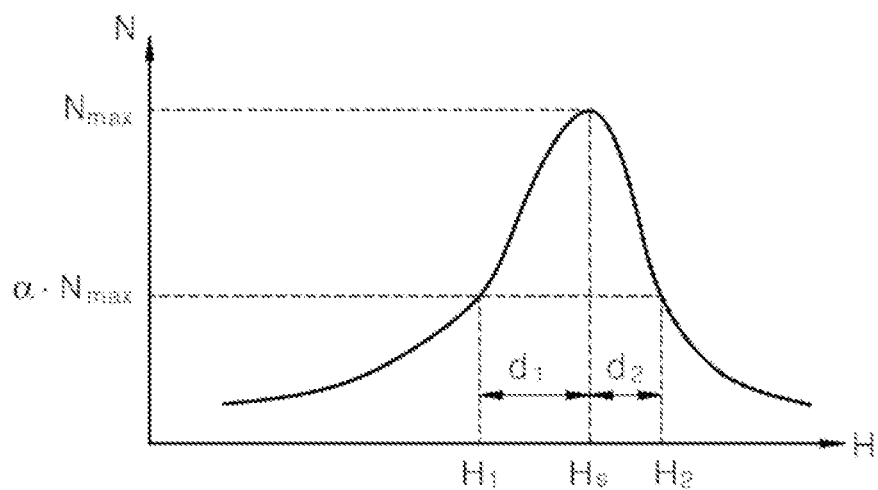
FIG. 10 is a diagram for describing a reference color range determining step according to another embodiment of the present disclosure.
Figure 11:
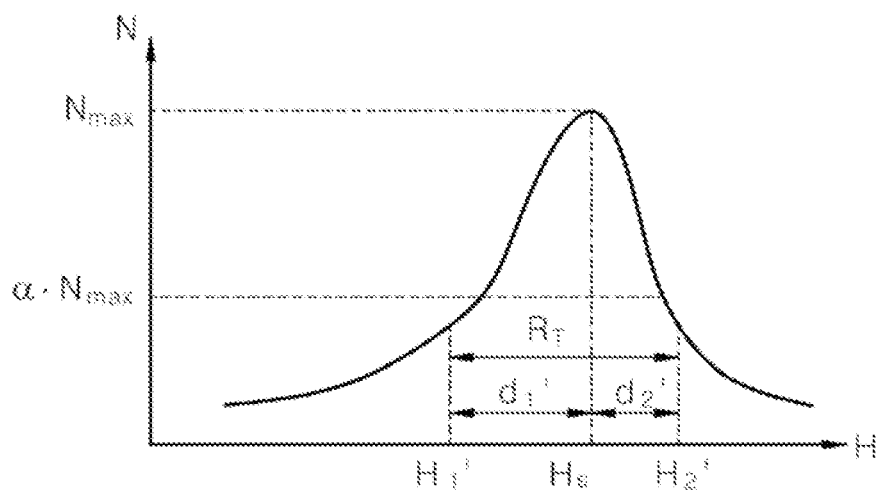
FIG. 11 is a diagram for describing a reference color range adjusting step.

FIG. 7 illustrates a histogram acquired in a step of generating a color histogram, together with a histogram corrected by removing noise. FIG. 8 is a diagram for describing a reference color determining step. FIG. 9 is a diagram for describing a reference color range determining step according to an embodiment of the present disclosure. FIG. 10 is a diagram for describing a reference color range determining step according to another embodiment of the present disclosure. FIG. 11 is a diagram for describing a reference color range adjusting step.

The present disclosure will be described with reference to FIG. 7 to FIG. 11 in connection with an exemplary color histogram of H (hue), which is one of the color elements of the HSV model. Such a description is identically applicable to other color elements S and V constituting the color model.

FIG. 7 is an H-N histogram, in which the horizontal axis indicates a color element value of color element H, and the vertical axis indicates a pixel number N obtained by counting pixels having the color element value of color element H.

The step (S121) of generating a color histogram may further include a histogram correcting step in which a pre-generated color histogram is corrected through moving average calibration.

Referring to FIG. 7, a pre-generated color histogram 711 has two color element values having a large pixel number N, and there is a problem in that it is difficult to determine a reference color for performing filtering in such a case. Of course, the color element value of color element H (hue) having the largest pixel number N may be determined as the reference color, but this may cause a problem in that, when determining a reference color range described later, more than two threshold color element values are set.

In addition, if an omitted part occurs because no number of counted pixels exists in the pre-generated color histogram, a situation may occur in which it is difficult to set a continuous range when determining a reference color range described later.

Therefore, in order to prevent such problems and to easily set the reference color and the reference color range, the color histogram 711 is preferably corrected appropriately.

The moving average calibration may refer to a scheme of performing calibration after dividing a color element into sections.

Referring to FIG. 7, color element values of color element H may be enumerated along the horizontal axis of the color histogram. As an example of the moving average calibration, multiple continuous color element values may be set as a single section, and the average value of pixel numbers associated with color element values included in the section may be corrected as the pixel number of a specific color element value in the section. The specific color element value in the section may be a color element value of at least one of the left side, the right side, or the center in the section.

Therefore, the original pixel number associated with the specific color element value displayed on the pre-generated color histogram 711 may be corrected by the average value of pixel numbers associated with color element values included in the section on the corrected histogram 712.

While moving the section from left to right along the horizontal axis of the color histogram, the average value of pixel numbers of the corresponding section is obtained, and the average value replaces the original pixel number associated with a specific color element value in the moving section.

As such, the corrected histogram 712 has an advantage in that, even when an omitted part occurs because no number of counted pixels exists on the pre-generated color histogram, a pixel number is assigned to the omitted part through moving average calibration, thereby making it easy to set a continuous range when determining a reference color range. Furthermore, the corrected histogram 712 can be expressed as a gentle curve through the moving average calibration such that the part having the maximum number of counted pixels is naturally highlighted, thereby making it easier to acquire a reference color and a reference color range than the pre-generated color histogram 711.

Unlike the above description, the step of generating a color histogram may be excluded in other embodiments of the present disclosure. More specifically, in a filtering step (S120), the user may select a color from image data through a user interface and determine the same as a reference color. For example, the color selected from image data may be an extracted color associated with a pixel selected by the user through a color picker provided on the user interface. However, without being limited thereto, any scheme may be used as long as at least one color can be extracted from the image data. In addition, the reference color range may be determined as a preset range from the extracted color as described above.

FIG. 8 is a diagram for describing a reference color determining step.

A reference color may be determined from a color histogram generated as described above. Referring to FIG. 8, in the step (S122) of determining a reference color, a color element value having the largest number of pixels counted in the color histogram may be determined as a reference color element value. For example, in the H-N histogram 701, the color element value having the largest pixel number Nmax may be determined as the reference color element value Hs.

This is because the reference color element value Hs having the largest number acquired by scanning the filtering object may represent the color of the filtering object. In an identical manner, respective reference color element values Ss and Vs may be determined in the S-N histogram 702 and the V-N histogram 703. Eventually, respective color element-specific reference color element values Hs, Ss, and Vs represent a single color, which may be determined as a reference color.

Meanwhile, the step (S122) of determining a reference color may be performed through the above-mentioned pre-generated color histogram 711 or through the corrected histogram 712.

FIG. 9 is a diagram for describing a reference color range determining step according to an embodiment of the present disclosure.

In the step (S123) of determining a reference color range, threshold color element values may be set in a predetermined range on both sides of a color element value having the largest number of counted pixels, and a reference color range may be determined therefrom. For example, the reference color range may have threshold element values formed at a uniform distance around a reference color.

Referring to the H-N histogram in FIG. 9, the reference color range refers to a range defined by threshold element values Hs−σ and Hs+σ having a distance of δ on both sides of a reference color element value Hs. This may be set identically or differently in the case of other color elements S and V.

When the reference color range is set to have an identical distance of δ for each color element, the reference color range may be (Hs−σ to Hs+σ, Ss−σ to Ss+σ, Vs−σ to Vs+σ). However, when the reference color range is set to have a different distance for each color element (σ in the case of H, τ in the case of S, and υ in the case of V), the reference color range may be (Hs−σ to Hs+σ, Ss−τ to Ss+τ, Vs−υ to Vs+υ). At this time, 2σ, 2τ, and 2υ, which are respective element-specific ranges, may be equal to or larger than a setup range RT. Meanwhile, the H color element needs to acquire a reference color range in a more precise range than the S color element and the V color element, and σ may thus be smaller than τ and υ.

FIG. 10 is a diagram for describing a reference color range determining step according to another embodiment of the present disclosure.

Referring to the H-N histogram in FIG. 10, in the step (S123) of determining a reference color range, a color element value corresponding to a predetermined ratio of the largest number of counted pixels, which is associated with a reference color, may be set as a threshold color element value, thereby determining a reference color range. For example, threshold color element values H1 and H2 may have a pixel number (α·Nmax) having a ratio as much as a of the largest pixel number Nmax associated with the reference color element Hs.

In the case of a color histogram formed with a substantial left/right asymmetry with reference to the largest pixel number Nmax, the reference color range, if determined according to the embodiment in FIG. 9, may be determined in a narrow range, thereby causing a problem in that a color that requires filtering will be omitted. In contrast, according to the embodiment in FIG. 10, a color element value having at least a predetermined pixel number (α·Nmax) is secured regardless of the left/right asymmetry. This is advantageous in that the reference color range is determined in a comparatively wide range, and no color that requires filtering will be omitted, thereby securing sufficient colors that require filtering.

The ratio regarding the largest pixel number (Nmax) may be identical or different among color elements. For example, threshold color element values H1 and H2 may be set by applying a ratio of α to the H color element, applying a ratio of β to the S color element, and applying a ratio of γ to the V color element. α, β, and γ may be real numbers larger than 0 and smaller than 1.

Meanwhile, the H color element needs to acquire a reference color range in a more precise range than the S color element and the V color element, and α may thus be larger than β and γ. When a color element value having a pixel number corresponding to a predetermined ratio of the largest pixel number Nmax is set as a threshold color element value, the distance from the reference color element value Hs to the first threshold color element value H1 may be a first distance d1, the distance from the reference color element value Hs to the second threshold color element value H2 may be a second distance d2, and the sum of the first distance d1 and the second distance d2 may be equal to or larger than a setup range RT.

Figure 12A:
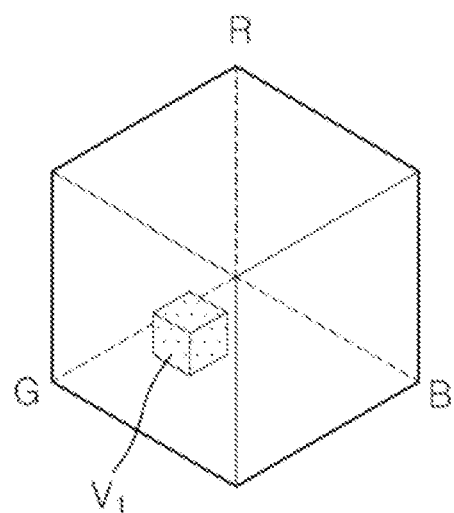
FIG. 12 illustrates a reference color range, which is a filtering range in FIG. 4.
Figure 12B:
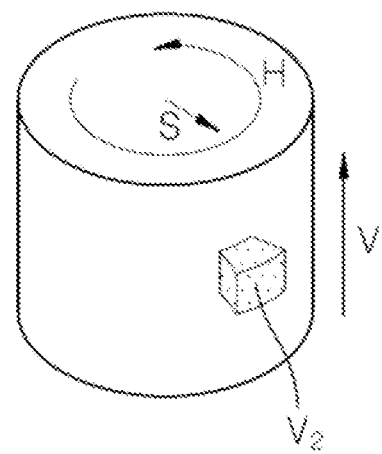
Figure 13:
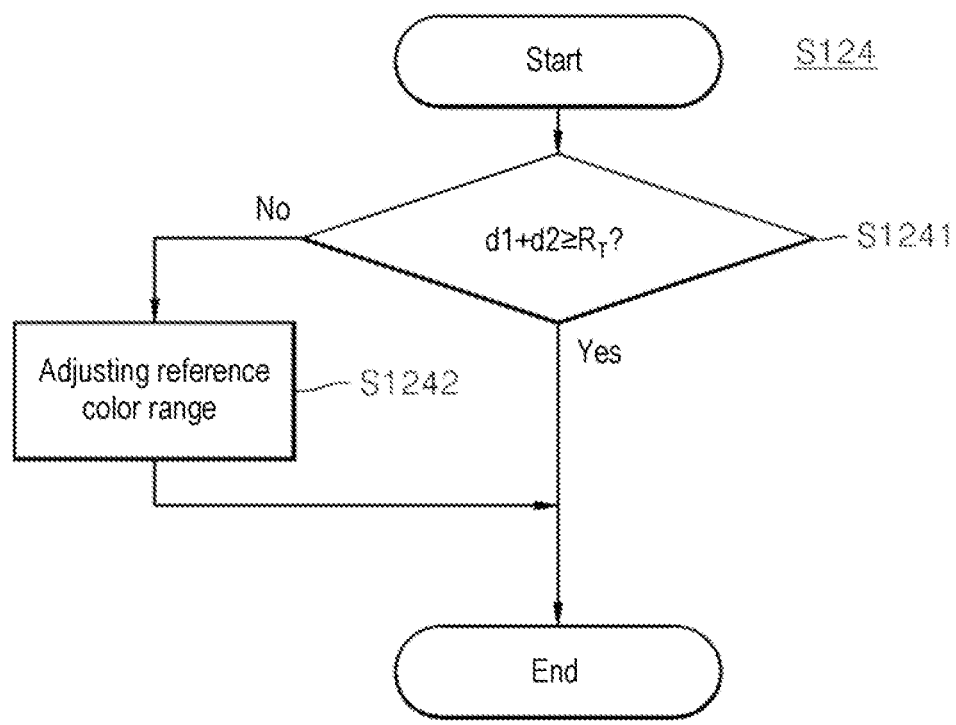
FIG. 13 is a flowchart of a detailed configuration of a reference color range adjusting step.

FIG. 11 is a diagram for describing a reference color range adjusting step. FIG. 12 illustrates a reference color range, which is a filtering range in FIG. 4. FIG. 13 is a flowchart of a detailed configuration of the reference color range adjusting step.

Referring to FIG. 11 to FIG. 13, the filtering step (S120) may further include a reference color range adjusting step (S124) in which, if the range of a threshold color element value that has been set according to the reference color range determining step (S123) is less than a setup range, the threshold color element value is adjusted so as to satisfy the setup range. In the reference color range adjusting step (S124), the threshold color element value is substantially changed to expand the reference color range.

The setup range RT refers to a minimum range of filtering that has been set in view of a case in which the filtering object and the modeling object have different scan environments, and solves the problem in that the range determined in the reference color range determining step (S123) is too narrow to perform an efficient filtering process. This is because, when the filtering object is scanned, only a part of the filtering object is scanned for a limited time at a predetermined position and angle, and accurate color acquisition is not easy compared with a case in which the modeling object is scanned. For example, when the filtering object is a glove, only the flat surface of the glove is scanned for a short time, and this may cause a problem in that the color included in the wrinkled surface of the glove fails to be filtered. Therefore, the reference color range needs to be expanded to easily filter the filtering object.

That is, in the reference color range adjusting step (S124), the first threshold color element value H1 may be adjusted to the left side of the color histogram, and the second threshold color element value H2 may be adjusted to the right side of the color histogram.

Referring to FIG. 13, in the reference color range adjusting step (S124), it is determined (S1241) whether the sum of the first distance d1 and the second distance d2 is equal to or larger than a setup range RT. If the sum of the first distance d1 and the second distance d2 is less than the setup range RT, the threshold color element value is adjusted (S1242), thereby adjusting the reference color range. The adjusted threshold color element values H1' and H2' may be adjusted at a uniform interval until the values become equal to or larger than the setup range RT. Therefore, the reference color range may be adjusted such that the adjusted first distance d1' between the reference color element value Hs and the adjusted first threshold color element value H1' and the adjusted second distance d2' between the reference color element value Hs and the adjusted second threshold color element value H2' becomes equal to or larger than the setup range RT.

When the interval between the threshold color element values H1' and H2' adjusted by the reference color range adjusting step (S124) is adjusted to become equal to or larger than the setup range RT, a uniform value may be added to or subtracted from the threshold color element values H1 and H2 so as to perform adjustment. An equation that can be used to perform such adjustment is given below:

$$H_1' = H_1 - \frac{R_T - (d_1 + d_2)}{2}$$ [Equation 1]

$$H_2' = H_2 + \frac{R_T - (d_1 + d_2)}{2}$$

If threshold color element values H1' and H2' adjusted according to Equation 1 above are applied, a reference color range may be determined so as to satisfy the setup range RT, which is the minimum desired range. In this case, there is an advantage in that, by determining the reference color range so as to satisfy the desired setup range, filtering can be performed with regard to a sufficient range.

In another embodiment, in the reference color range adjusting step (S124), the threshold color element values may be adjusted in proportion to the distances from the reference element value Hs to respective threshold color element values H1 and H2. More specifically, if the sum of distances d1+d2 from the reference element value Hs to respective threshold color element values H1 and H2 is less than the setup range RT, threshold color element values H1' and H2' adjusted to correspond to the following equation may be applied:

$$H_1' = H_S - \frac{d_1}{d_1 + d_2} R_T$$

$$H_2' = H_S + \frac{d_2}{d_1 + d_2} R_T$$

By applying the threshold color element values H1' and H2' adjusted to correspond to Equation 2 above, a reference color range satisfying the setup range RT, which is the minimum range desired, may be determined.

In addition, by adjusting the threshold color element values in proportion to the differences from the reference element value Hs to the threshold color element values H1 and H2, the ratio of application of the reference color range is reflected, thereby effectively excluding the color of the filtering object.

The color of the filtering object may be excluded by determining the reference color range as described above. In the RGB model, a color portion having a volume as indicated by reference numeral V1 in FIG. 12 may be excluded when generating a three-dimensional surface model, and in the HSV model, a color portion having a volume as indicated by reference numeral V2 may be excluded when generating a three-dimensional surface model.

Meanwhile, in the filtering step (S120), at least some of pieces of image data acquired in the scan step (S110) may be used. For example, in the filtering step (S120), the above-mentioned first type image data may be used to filter the reference color or reference color range of the filtering object on the basis of image data having color information. According to the prior art, a filtering object is scanned to generate a three-dimensional surface model of the filtering object, a reference color or a reference color range is identified on the basis of the three-dimensional surface model, and the corresponding reference color or reference color range is deleted when generating a three-dimensional surface model of a modeling object. However, the filtering object is simply scanned to acquire the reference color or reference color range, which is to be excluded or deleted, and it is unnecessary for the filtering object to undergo three-dimensional modeling to acquire the reference color or reference color range. Rather, unnecessary computational load is applied to the system by three-dimensionally modeling the filtering object and extracting the reference color or reference color range from the three-dimensional model of the filtering object, thereby interfering with speedy acquisition of the three-dimensional surface model of the modeling object.

In contrast, according to a three-dimensional modeling method according to the present disclosure, the second type image data among multiple pieces of two-dimensional data acquired in the scan step (S110) is not used in the filtering step (S120), and this is advantageous in that speedy filtering is possible in two-dimensional areas. That is, image data acquired in the scan step (S110) is not used to generate a three-dimensional surface model, a color distribution is simply acquired from two-dimensional planar image data, and a reference color or a reference color range can be determined thereby. Therefore, the three-dimensional modeling method according to the present disclosure is advantageous in that, since the filtering object is not subjected to three-dimensional modeling, the computational load is reduced, and the computational speed in the entire filtering process and three-dimensional modeling process of the modeling object is increased.

As another example, according to the three-dimensional modeling method according to the present disclosure, two-dimensional image data for acquiring color information may be solely acquired in the scan step (S110). For example, the filtering object is scanned in the scan step (S110) to acquire at least one set of two-dimensional planar image data. The two-dimensional planar image data may include image data acquired by emitting white light to the filtering object. Alternatively, the two-dimensional planar image data may include image data acquired by emitting red light to the filtering object, acquired by emitting green light to the filtering object, and acquired by emitting blue light to the filtering object. Meanwhile, unlike the above description, no structured light may be emitted to the filtering object, and no two-dimensional image data may be acquired in a state in which structured light is applied to the filtering object. That is, no three-dimensional surface model may be generated from the filtering object, and no second type image data having depth information of two-dimensional image data may be acquired. This is advantageous in that the scan step (S110) and the filtering step (S120) can be performed more speedily, the computational load of the system is reduced, and the computational speed is increased.

Meanwhile, after filtering the reference color or reference color range from image data of the filtering object as described above, the modeling object is scanned (S130), thereby generating a three-dimensional surface model of the modeling object (S140). In addition, in the step (S140) of generating the three-dimensional surface model, the three-dimensional surface model of the modeling object may be generated by excluding the reference color or reference color range.

In the step (S130) of scanning the modeling object, two-dimensional image data for acquiring color information of the modeling object (that is, first type image data of the modeling object) and two-dimensional image data for acquiring depth information of the modeling object (that is, second type image data of the modeling object) may be acquired. Accordingly, in the step (S140) of generating the three-dimensional surface model, the second type image data of the modeling object may be used to generate a three-dimensional surface model of the modeling object on the basis of the depth information, and the first type image data of the modeling object may be used to allocate a color to the three-dimensional surface model.

The reference color or reference color range determined in the filtering step (S120) described above may be excluded when the three-dimensional surface model is generated. More specifically, among pixels constituting first type image data of the modeling object, pixels having a color corresponding to the reference color or reference color range are sensed. Pixels of second type image data, to which the pixels having a color corresponding to the reference color or reference color range correspond, are excluded when generating a three-dimensional surface model of the modeling object. Therefore, the pixels having a color corresponding to the reference color or reference color range are not subjected to three-dimensional modeling, and the three-dimensional surface model of the modeling object can thus be acquired more speedily and accurately.

Here, when pixels of image data of the filtering object all have substantially the same color, or when the difference between the pixel number of the reference color and the pixel number of colors falling within a predetermined range from the reference color is noticeably large, a three-dimensional surface model of the modeling object may be generated by filtering the reference color only, not the reference color range.

Alternatively, as in the color histograms illustrated in FIG. 6 to FIG. 11, which have predetermined distributions on both sides of the color element value having the largest number of counted pixels, a three-dimensional surface model of the modeling object may be generated by filtering the reference color range, not the reference color.

As such, by removing a color corresponding to the reference color or the reference color range, among colors of the filtering object, in the three-dimensional surface model generating process, unnecessary use of system resources is prevented, and it is possible to acquire speedy three-dimensional modeling and a highly-reliable three-dimensional surface model. Since a three-dimensional scanner performs three-dimensional modeling by receiving light reflected from the surface of the object, the modeling color may change minutely even if the same glove is modeled. In a three-dimensional modeling method according to the present disclosure, even if there is a change in various scan environments including the lighting condition, a filtering reference color or reference color range conforming to the change in the scan environment may be determined and extracted.

Hereinafter, a three-dimensional modeling device according to the present disclosure will be described. Repeated descriptions already made in connection with the three-dimensional modeling method according to the present disclosure will be partially omitted herein.

Figure 14:
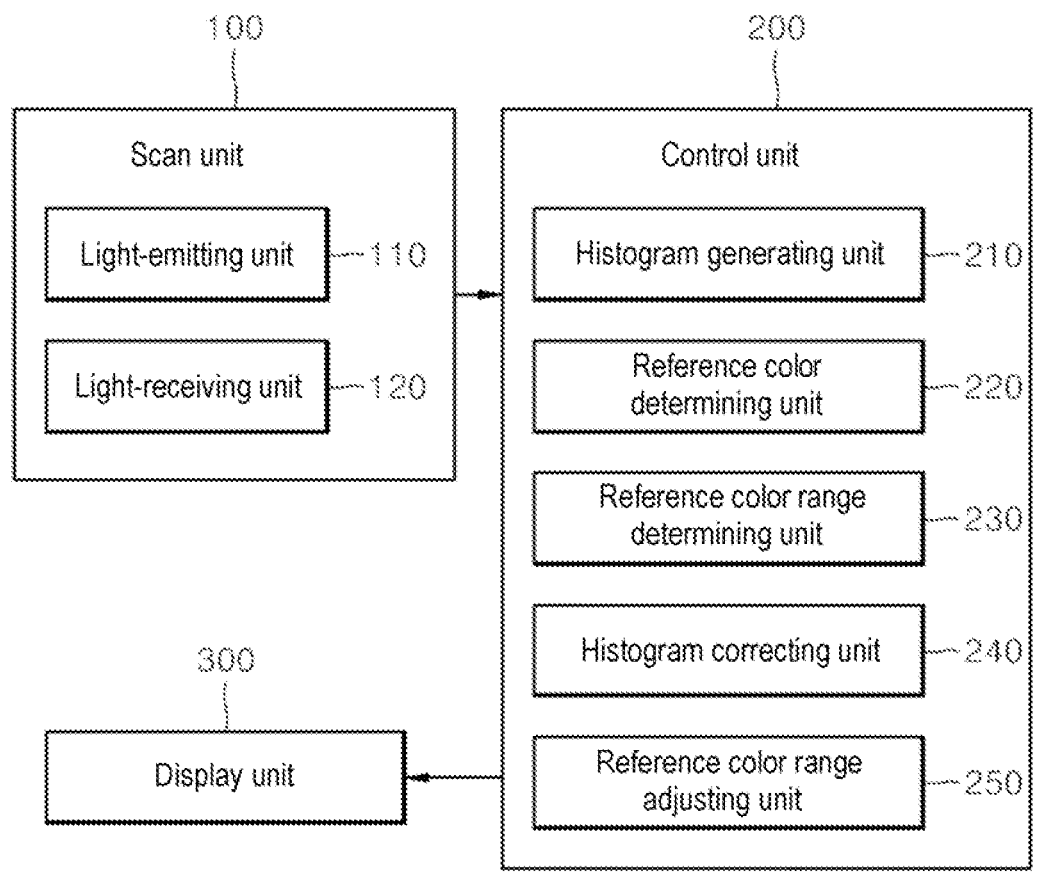
FIG. 14 illustrates a schematic configuration of a three-dimensional modeling device according to the present disclosure.
Figure 15:
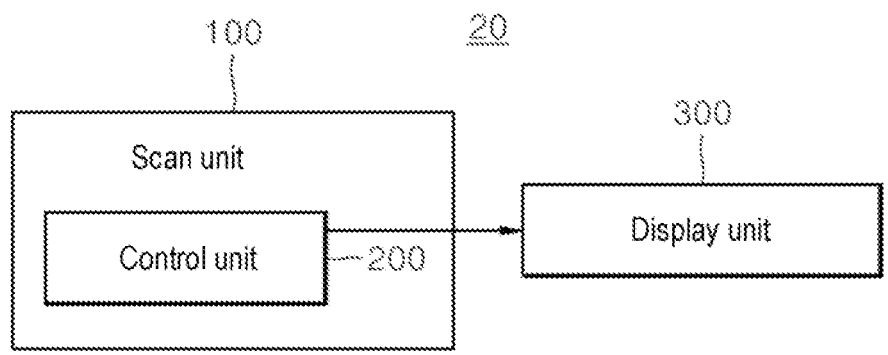
FIG. 15 illustrates a schematic configuration of a three-dimensional modeling device according to an alternative embodiment of the present disclosure.

FIG. 14 illustrates a schematic configuration of a three-dimensional modeling device according to the present disclosure. FIG. 15 illustrates a schematic configuration of a three-dimensional modeling device according to an alternative embodiment of the present disclosure.

Referring to FIG. 14 and FIG. 15, the three-dimensional modeling device 10 according to the present disclosure may include a scan unit 100 configured to scan a filtering object and acquire image data, and a control unit 200 configured to determine a reference color or a reference color range, which becomes the object of filtering with regard to image data, and perform filtering.

First, the scan unit 100 may scan a filtering object and acquire image data of the filtering object. To describe a process of acquiring a three-dimensional model of a patient's oral interior (referring to teeth, gums, and the like) by using a three-dimensional scanner as an example, teeth in the patient's oral interior correspond to modeling objects, and the hands or sanitary gloves of the user, saliva from the patient's oral cavity, and foreign materials in the oral cavity correspond to filtering objects. In addition, the scan unit 100 may scan a modeling object for generating a three-dimensional surface model.

The scan unit 100 may include a light-emitting unit 110 and a light-receiving unit 120 for scanning a filtering object and a modeling object. The light-emitting unit 110 may be an optical projector and may emit various types of light toward an object. The light may have various wavelengths, and may be pattern-type structured light, if necessary.

The light-emitting unit 110 may be used to independently emit RGB light so as to acquire a chromatic-series color model having at least two color elements as described above, for example, the RGB model. However, image data may be acquired without emitting light from the light-emitting unit 110, as in the case of a color image sensor, thereby acquiring colors included in the image data in terms of the RGB model.

The light-receiving unit 120 may receive light reflected from the surface of an object so as to acquire image data. The image data may include two-dimensional image data or three-dimensional image data. The light-receiving unit 120 may include at least one camera and a color imaging sensor electrically connected to the camera. The camera may receive light introduced into the scan unit 100 through a lens, and the color imaging sensor may analyze the received light, thereby generating image data. As the color imaging sensor, at least one of commonly known sensors such as a CCD sensor and a CMOS sensor may be selected and used.

Meanwhile, the scan unit 100 may acquire two-dimensional image data when scanning a filtering object, and the two-dimensional image data acquired by scanning the filtering object may include first type image data indicating color information and second type image data indicating depth information. If necessary, the scan unit 100 may acquire only the first type image data indicating color information of the filtering object in the process of scanning the filtering object. Details related thereto are the same as described above.

Meanwhile, the control unit 200 calculates/processes acquired image data. The control unit 200 acquires a color from image data acquired by the scan unit 100, and determines a reference color or a reference color range, which becomes the object of filtering. As illustrated in FIG. 14, the control unit 200 may be configured as a separate part formed to be physically separate from the scan unit 100, or configured as a processor included as a component of the scan unit 100 as illustrated in FIG. 15.

Hereinafter, detailed components of the control unit 200 and operations of the individual components will be described.

The control unit 200 acquires colors from image data of a filtering object. The image data is two-dimensional image data or three-dimensional image data, and the specific method for acquiring the colors of the filtering object from two-dimensional image data is the same as described above.

The control unit 200 may include a color histogram generating unit 210 configured to generate a color histogram by counting the number of pixels having color element values according to individual color elements constituting a color model of colors included in image data.

As described above, a pixel number N obtained by counting pixels having a specific color element value in image data may correspond to the vertical axis of a color histogram. Color elements when the RGB model is used to generate a color histogram are red, green, and blue, and color elements when the HSV model is used to generate a color histogram are hue, saturation, and value.

Meanwhile, the control unit 200 may generate a color histogram with a color model different from the color model used by the scan unit 100 to acquire image data. More specifically, the color histogram generating unit 210 of the control unit 200 may generate a color histogram with a color model different from the color model used by the scan unit 100 to acquire image data. For example, image data acquired by the scan unit 100 may be based on the RGB model. The color histogram generating unit 210 of the control unit 200 may convert color information of image data generated according to the RGB model into that the HSV model, thereby generating a color histogram based on the HSV model. The HSV model, if used by the color histogram generating unit 210, may make it easy to group similar colors, thereby facilitating determination of the reference color range.

Meanwhile, the control unit 200 may further include a histogram correcting unit 240 configured to perform moving average calibration for a pre-generated color histogram. When it is difficult to easily acquire a reference color and a reference color range by using the above-mentioned color histogram, the histogram correcting unit 240 may correct the color histogram. The corrected color histogram may use a moving average calibration method and, more specifically, a color histogram acquired for each color element may be divided into predetermined sections such that correction is performed for each section. In the case of a corrected histogram generated by the histogram correcting unit 240, the part having the largest number of counted pixels is highlighted, and remaining parts have predetermined distributions on both sides of the color element value having the largest number of counted pixels, thereby making it easier to acquire a reference color and a reference color range than the pre-generated color histogram.

Unlike the above description, in another embodiment of the present disclosure, a reference color may be acquired without going through the color histogram generating unit 210 and the histogram correcting unit 240. The control unit 200 may determine that a color selected from image data is the reference color. For example, as the color selected from image data, a color of a predetermined pixel may be extracted through a color picker provided on the user interface. However, without being limited thereto, any scheme may be used as long as at least one color can be extracted from the image data. In addition, the reference color range may be determined as a specific range which is preset from an extracted color as described above.

Meanwhile, the control unit 200 may include a reference determining unit configured to determine a reference color or a reference color range from a color histogram acquired by the color histogram generating unit 210. The reference determining unit may include at least one of a reference color determining unit 220 configured to determine a reference color and a reference color range determining unit 230 configured to determine a reference color range.

The reference color determining unit 220 may determine that a color element value having the largest number of counted pixels in a color histogram is a reference color element value. Color element-specific reference color element values Hs, Ss, and Vs express a single color, which may be determined as a reference color.

In addition, the reference color determining unit 220 may determine that a color element value having the largest number of counted pixels in a color histogram corrected by moving average calibration is a reference color element value. The reference color determining unit 220 may perform the above-described step of determining a reference color, and the process of determining a reference color is the same as described above.

In addition, the control unit 200 may include a reference color range determining unit 230 configured to determine a reference color range, which is a filtering range, from a reference color. After the reference color is determined by the reference color determining unit 220, the reference color range determining unit 230 may determine that an area satisfying a predetermined condition for the determined reference color is a reference color range. The reference color range determining unit 230 may set threshold color element values in a predetermined range on both sides of each color element-specific reference color element value, and may determine the reference color range therefrom. The predetermined range may be a fixed range, and the reference color range determining unit 230 may determine that an element value spaced apart so as to have an identical interval from color element values associated with the reference color is a threshold color element value. The detailed process of determining a threshold color element value is the same as described above.

In addition, the reference color range determining unit 230 may set a color element value corresponding to a predetermined ratio of a pixel number associated with a color element value having the largest number of counted pixels as a threshold color element value, thereby determining a reference color range. For example, in the case of an H-N color histogram having an array of color element values of hue, a color element value having a pixel number corresponding to a predetermined ratio ($\alpha$) of the largest pixel number (Nmax) may be set as a threshold color element value. That is, the pixel number associated with the threshold color element value may be $\alpha \cdot$Nmax. By determining a reference color range by using such a ratio, colors conforming to the filtering object may be filtered. Particularly, even when a color histogram having a left/right asymmetry with reference to the largest pixel number (Nmax) is generated, a highly reliable reference color range may be generated such that colors conforming to the filtering object are filtered.

Here, the ratios applied for individual color elements by the reference color range determining unit 230 may differ. For example, the hue color element may have a comparatively narrow reference color range for accurate filtering, and the saturation and value color elements may have comparatively wide reference color ranges. Therefore, the ratio $\alpha$ applied to a color histogram for the hue color element may be larger than the ratio $\beta$ applied to a color histogram for the saturation color element and the ratio $\gamma$ applied to a color histogram for the value color element.

Meanwhile, the control unit 200 may further include a reference color range adjusting unit 250 such that, when the range of a threshold color element value set by the reference color range determining unit 230 is less than a setup range, the threshold color element value is adjusted so as to satisfy the setup range. When a reference color range acquired by applying the above-mentioned predetermined ratio is less than a setup range desired by the user, the reference color range adjusting unit 250 may expand the reference color range to the setup range. More specifically, expanding the reference color range may correspond to moving a threshold color element value in the reference color range to both sides in the color histogram. That is, the reference color range adjusting unit 250 may adjust a first threshold color element value, which is the lower limit of the reference color range, leftwards and may adjust a second threshold color element value, which is the upper limit of the reference color range, rightwards.

Here, the reference color range adjusting unit 250 may adjust threshold color element values in proportion to a difference from a reference color element value to the threshold color element value. This may correspond to expanding the reference color range in proportion to a section distance from the reference color element value to the first threshold color element value (above-mentioned first distance) and a section distance from the reference color element value to the second threshold color element value (above-mentioned second distance). Accordingly, the reference color range adjusting unit 250 may adjust threshold color element values so as to reflect the section distances from the reference color element value. Consequently, this is advantageous in that threshold color element values are adjusted so as to satisfy the setup range while maintaining range characteristics of the pre-adjustment reference color range. The process of adjusting threshold color element values is the same as described above, and the reference color range adjusting unit 250 may adjust threshold color element values according to above-mentioned Equation 1 or 2.

By means of the above-mentioned configuration of the control unit 200, the reference color or reference color range may be determined by the image data acquired from the scan unit 100. The control unit 200 determines the reference color or reference color range by using first type image data representing color information among pieces of image data acquired by scanning a filtering object. Accordingly, the filtering object is not subjected to three-dimensional modeling, and the reference color or reference color range is determined from two-dimensional image data, thereby providing an advantage in that the computational load on the three-dimensional modeling device according to the present disclosure is reduced, and the computational speed is increased. The color filtering process performed by the control unit 200 is the same as described above.

The control unit 200 may filter the reference color or reference color range from the image data of the filtering object as described above, scan the modeling object so as to generate a three-dimensional surface model regarding the modeling object, and may exclude the reference color or reference color range in the process of generating the three-dimensional surface model, thereby generating a three-dimensional surface model of the modeling object.

As the three-dimensional modeling technology for generating the three-dimensional surface model, the above-mentioned technology based on structured light may be used, or a three-dimensional surface model may be generated by using multiple pieces of two-dimensional image data according to a known technology.

In addition, when the control unit 200 generates a three-dimensional surface model of a modeling object, pixels of first type image data of a modeling object having a color corresponding to a reference color or a reference color range determined on the basis of image data of a filtering object may be sensed. Pixels of second type image data, to which pixels having a color corresponding to the reference color or reference color range, are excluded when generating the three-dimensional surface model of the modeling object. Accordingly, pixels having a color corresponding to the reference color or reference color range are not subjected to three-dimensional modeling, and the three-dimensional surface model of the modeling object can thus be acquired more speedily and accurately.

Figure 16:
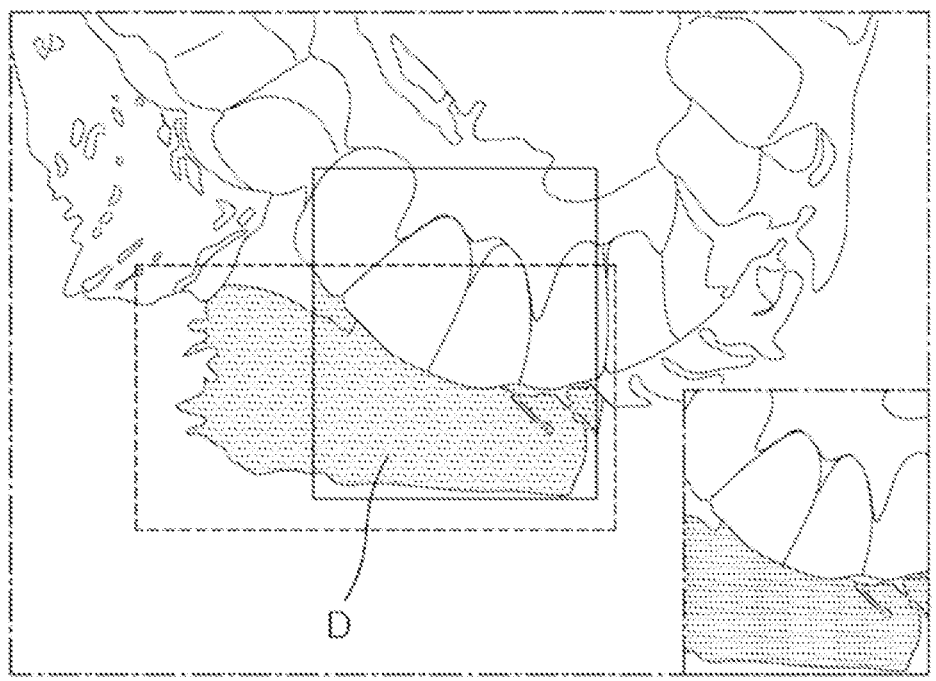
FIG. 16 illustrates a result of scanning a modeling object without filtering that uses a reference color range according to a comparative example.
Figure 17:
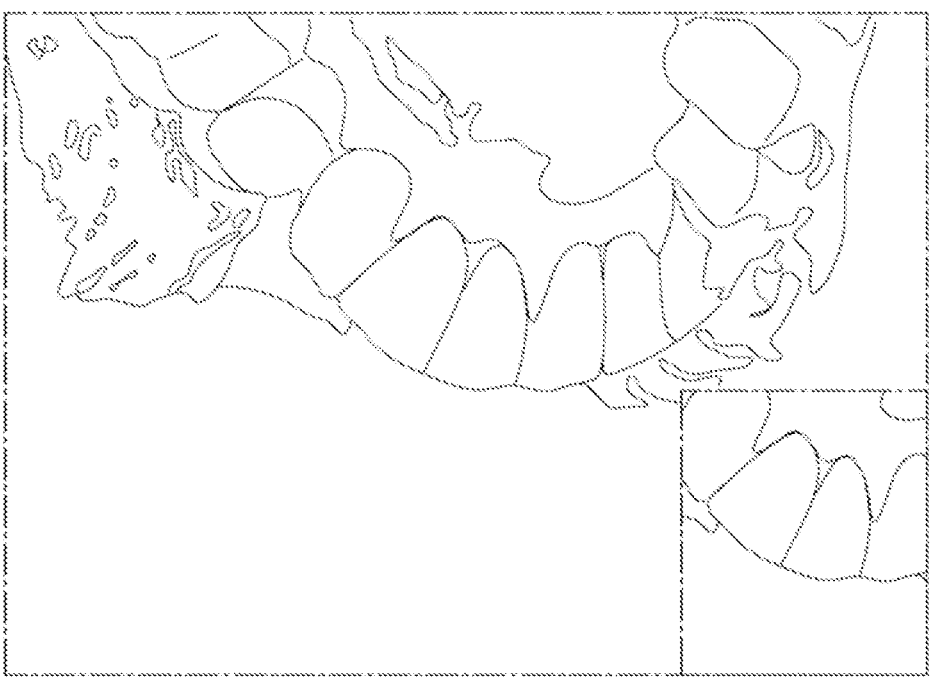
FIG. 17 illustrates a result of scanning a modeling object by applying filtering in a reference color range according to an embodiment of the present disclosure.

FIG. 16 illustrates a result of scanning a modeling object without filtering that uses a reference color range according to a comparative example. FIG. 17 illustrates a result of scanning a modeling object by applying filtering in a reference color range according to an embodiment of the present disclosure.

As illustrated in FIG. 16, when scanning a modeling object without filtering that uses a reference color range described in connection with a three-dimensional modeling method according to the present disclosure, an image of the filtering object D is input together, and the color of the corresponding part is acquired and displayed through a display unit 300. As a result, a three-dimensional surface model is generated from the unnecessary filtering object D, thereby reducing the reliability of the three-dimensional surface model of the modeling object.

In contrast, as illustrated in FIG. 17, by applying filtering in a reference color range described in connection with a three-dimensional modeling method according to the present disclosure and a three-dimensional modeling device using the same, the filtering object D may be excluded when generating a three-dimensional surface model of the modeling object, and the user may thus acquire a highly-reliable three-dimensional surface model of the modeling object.

The above descriptions are only exemplary descriptions of the technical idea of the present disclosure, and various modifications and changes can be made without departing from the essential characteristics of the present disclosure by those skilled in the art to which the present disclosure pertains.

Therefore, embodiments disclosed herein are not for limiting the technical idea of the present disclosure but for describing the same, and the scope of the technical idea of the present disclosure is not limited by such embodiments.

The scope of protection of the present disclosure is to be interpreted by the appended claims, and all technical ideas falling within equivalent ranges are to be interpreted as being included in the scope of rights of the present disclosure.

INDUSTRIAL APPLICABILITY

The present disclosure provides a three-dimensional modeling method and an apparatus using the same, wherein a reference color is determined from image data acquired from a filtering object, or a color within a predetermined range is determined from the reference color as a reference color range that becomes the object of filtering such that, when a modeling object is scanned, a portion corresponding to the reference color or the reference color range is excluded during three-dimensional surface model conversion.

What is claimed is:

1. A three-dimensional modeling method performed by a three-dimensional modeling device, the method comprising:
   a scan step, performed by a scan unit of the three-dimensional modeling device, of scanning a first object so as to acquire at least one set of first image data, the first object being an object to be excluded from a three-dimensional surface model of a second object;
   a step, performed by a control unit of the three-dimensional modeling device, of determining a reference color or a reference color range from a color included in the at least one set of first image data acquired in the scan step; and
   a step, performed by the control unit, of generating the three-dimensional surface model of the second object, based on at least one set of second image data which is acquired by scanning the second object, and not based on the at least one set of first image data,
   wherein, in the step of generating the three-dimensional surface model, the three-dimensional surface model is generated by excluding the reference color or the reference color range, and
   wherein the scan step of scanning the first object is performed prior to the scanning of the second object.

2. The three-dimensional modeling method of claim 1, wherein the step of determining the reference color or the reference color range comprises:
   a step of generating a color histogram by using a color element value of a color included in each pixel included in the at least one set of first image data, and a pixel number obtained by counting pixels comprising a color having an identical color element value; and
   a step of determining the reference color or the reference color range from the color histogram.

3. The three-dimensional modeling method of claim 2, wherein the step of generating a color histogram further comprises a histogram correcting step of correcting the color histogram through moving average calibration, the moving average calibration being performed to divide the color histogram into a section and correct the pixel number by the average value of the pixel count of the identical color element value included in the section, and
   wherein, in the step of determining the reference color or the reference color range, the reference color or the reference color range is determined through a color histogram corrected after the histogram correcting step.

4. The three-dimensional modeling method of claim 1, wherein the color included in the at least one set of first image data is acquired by using a color model having at least two color elements, and wherein in the step of determining the reference color or the reference color range, a color histogram is generated with a color model different from a color model used to acquire the color of the at least one set of first image data in the scan step.

5. The three-dimensional modeling method of claim 2, wherein, in the step of determining the reference color among the step of determining the reference color or the reference color range, the reference color is determined from a color element value having the largest number of counted pixels in the color histogram.

6. The three-dimensional modeling method of claim 5, wherein, in the step of determining the reference color range, the reference color range is determined by setting a predetermined range on both sides of a color element value having the largest number of counted pixels.

7. The three-dimensional modeling method of claim 5, wherein, in the step of determining the reference color range, the reference color range is determined by setting a color element value corresponding to a predetermined ratio of a pixel number of a color element value having the largest number of counted pixels, as a threshold color element value.

8. The three-dimensional modeling method of claim 7, wherein the predetermined ratio differs for each color element.

9. The three-dimensional modeling method of claim 7, wherein the step of determining the reference color or reference color range further comprises a reference color range adjusting step in which, when the threshold color element value has a range less than a setup range, the threshold color element value is adjusted to satisfy the setup range.

10. The three-dimensional modeling method of claim 1, wherein the at least one set of first image data of the first object acquired in the scan step comprises at least one set of first type image data for acquiring color of the first object and at least one set of second type image data for acquiring depth information of the first object, and
wherein, in the step of determining the reference color or the reference color range, the reference color or the reference color range is filtered by using the first type image data.

11. The three-dimensional modeling method of claim 1, wherein, in the scan step, at least one set of two-dimensional image data for acquiring the color of the first object is acquired, and
wherein, in the step of determining the reference color or the reference color range, the reference color or the reference color range is filtered by using the at least one set of two-dimensional image data.

12. The three-dimensional modeling method of claim 1, wherein, in the step of generating a three-dimensional surface model, the three-dimensional surface model is generated on the basis of multiple pieces of two-dimensional image data of the second object acquired by scanning the second object,
wherein the multiple pieces of two-dimensional image data of the second object comprise first type image data for acquiring color of the second object and second type image data for acquiring depth information of the second object, and
wherein a pixel of the second type image data corresponding to a pixel corresponding to the reference color or the reference color range among the first type image data of the second object is excluded when the three-dimensional surface model is generated.

13. A three-dimensional modeling device comprising:
a scan unit configured to scan a first object so as to acquire at least one set of first image data, the first object being an object to be excluded from a three-dimensional surface model of a second object; and
a control unit configured to determine a reference color or a reference color range from a color included in the at least one set of first image data acquired by scanning the first object and generate the three-dimensional surface model of the second object by excluding the reference color or the reference color range, based at least one set of second image data which is acquired by scanning the second object, and not based on the at least one set of first image data,
wherein the scan unit configured to perform the scanning of the first object prior to the scanning of the second object.

14. The three-dimensional modeling device of claim 13, wherein the control unit comprises:
a color histogram generating unit configured to generate a color histogram by using a color element value of a color included in each pixel included in the at least one set of first image data, and a pixel number obtained by counting pixels comprising a color having an identical color element value;
a histogram correcting unit configured to perform moving average calibration based on the color histogram, the moving average calibration being performed to divide the color histogram into a section and correct the pixel number by the average value of the pixel count of the identical color element value included in the section; and
a reference determining unit comprising at least one of a reference color determining unit configured to determine a reference color from the color histogram or a reference color range determining unit configured to determine a reference color range from the color histogram,
wherein the color histogram generating unit generates the color histogram with a color model different from a color model used by the scan unit to acquire the at least one set of first image data, and
the reference determining unit determines the reference color of the reference color range through a color histogram corrected after the moving average calibration by the histogram correcting unit.

15. The three-dimensional modeling device of claim 14, wherein the reference color determining unit determines the reference color from a color element value having the largest number of counted pixels in the color histogram, and
wherein the reference color range determining unit determines the reference color range by setting a predetermined range on both sides of a color element value having the largest number of counted pixels, or determines the reference color range by setting a color element value corresponding to a predetermined ratio of a pixel number of a color element value having the largest number of counted pixels, as a threshold color element value.

16. The three-dimensional modeling device of claim 15, wherein the predetermined ratio differs for each color element.

17. The three-dimensional modeling device of claim 15, wherein the control unit further comprises a reference color range adjusting unit configured such that, when the threshold color element value set by the reference color range determining unit has a range less than a setup range, the threshold color element value is adjusted to satisfy the setup range.

18. The three-dimensional modeling device of claim 13, wherein the at least one set of first image data of the first object acquired by the scan unit comprises at least one set of first type image data for acquiring color of the first object and at least one set of second type image data for acquiring depth information of the first object, and wherein the control unit filters the reference color or the reference color range by using the first type image data.

19. The three-dimensional modeling device of claim 13, wherein the scan unit acquires pieces of two-dimensional image data for acquiring the color of the first object, and wherein the control unit filters the reference color or the reference color range by using the pieces of two-dimensional image data.

20. The three-dimensional modeling device of claim 13, wherein the control unit generates the three-dimensional surface model on the basis of multiple pieces of two-dimensional image data of the second object acquired by scanning the second object with the scan unit, wherein the multiple pieces of two-dimensional image data of the second object comprise first type image data for acquiring color of the second object and second type image data for acquiring depth information of the second object, and wherein a pixel of the second type image data corresponding to a pixel corresponding to the reference color or the reference color range among the first type image data of the second object is excluded when the three-dimensional surface model is generated.

\* \* \* \* \*